United States Patent [19]

Garrison

[11] 4,228,889
[45] Oct. 21, 1980

[54] LUBRICATION CONNECTOR FOR ROLLER CONVEYORS

[75] Inventor: Stephen N. Garrison, Anderson, S.C.

[73] Assignee: Dresser Industries, Inc., Dallas, Tex.

[21] Appl. No.: 14,396

[22] Filed: Feb. 23, 1979

[51] Int. Cl.³ ............................................. B65G 45/02
[52] U.S. Cl. ..................................... 198/501; 285/13; 285/DIG. 25; 308/187
[58] Field of Search .................. 198/500, 501; 308/20, 308/187; 184/105 R; 285/13, 94, DIG. 25

[56] References Cited

U.S. PATENT DOCUMENTS

| | | | |
|---|---|---|---|
| 3,259,227 | 7/1966 | Steinmetz | 198/501 |
| 3,338,381 | 8/1967 | Imse | 198/501 |
| 3,460,874 | 8/1969 | Johnson | 308/187 X |
| 3,489,471 | 1/1970 | Kelley | 308/187 |
| 3,809,211 | 5/1974 | Padilla | 198/501 |
| 3,892,306 | 7/1975 | Bertaud | 198/501 |
| 3,960,243 | 6/1976 | Di Antonio | 198/501 X |

*Primary Examiner*—James L. Rowland
*Attorney, Agent, or Firm*—Fred A. Winans; Eddie E. Scott

[57] ABSTRACT

An improved lubrication connector for roller conveyors of the type which includes a pair of idlers positioned end-to-end, each idler being rotatably mounted on a hollow shaft through bearing assemblies. The shafts communicate with associated bearing assemblies which are lubricated by forcing lubricant through the hollow shafts. A flexible tube connects adjacent portions of the hollow idler shafts for transporting lubricant from one shaft to the other. The improvement includes one end of the tube being resiliently held in place relative to one of the hollow shafts so that the interior of the tube will communicate with the interior of said hollow shaft, the other end of the tube being sized and shaped slightly smaller than the interior of the other hollow shaft for allowing the tube to be inserted in the shaft yet large enough to prevent lubricant under pressure from leaking between the tube and shaft. The tube will deflect when the lubricant exceeds a predetermined amount which causes one end to move outwardly in its cooperating hollow shaft. The end is contoured to provide a lubricant leakage passage permitting lubricant to escape from the tube and shaft before the end of the tube reaches the outer end of its cooperating hollow shaft.

10 Claims, 4 Drawing Figures

LUBRICATION CONNECTOR FOR ROLLER CONVEYORS

BACKGROUND OF THE INVENTION

This invention relates to conveyors and, more particularly, to lubricating systems for multiple idler arrangements.

Many conveying systems are formed with idlers mounted on a hollow spindle or shaft through appropriate bearing configurations. These systems include multiple idler arrangements which form a catenary where adjacent idlers are connected to each other through a support joint and to the roller housing at the outer ends of the arrangement. Conveyor systems can also be formed where both ends of each idler roller are connected to a supporting housing instead of the idlers supporting themselves.

For both supported and catenary arrangements, there are advantages to providing what is called "flow-through" lubrication where the idler shafts, which are hollow and communicate with their associated bearing assemblies, are connected to each other so that all the idlers in the arrangement can be lubricated simply by applying lubrication at one end of the arrangement. The connection between adjacent hollow idler shafts has been formed by a flexible tube which can be connected to the adjacent shafts by appropriate means. These flexible connectors are effective in accommodating relative movement between adjacent idlers. Examples of the use of such flexible tube connectors can be found in U.S. Pat. Nos. 3,809,211; 3,892,306; and 3,338,381.

Although the use of flexible tubes has been found to be satisfactory, installation is relatively complicated and time consuming. Further, even though the tube is flexible, problems could occur with the catenary idlers where adjacent idlers can shift relative to each other an amount greater than the flexure capability of the tube, causing rupture. In addition, should lubricant be injected into the system under a pressure too great to be accommodated by the flexible tube, rupture or tube expulsion could also occur.

SUMMARY OF THE INVENTION

These problems have been solved by the invention described in detail below where one end of such a flexible tube is held in place by a spring and the other end is axially movable relative to its associated idler shaft and where the tube is designed to operate as a safety valve when the lubricant pressure exceeds a predetermined safe level.

The improved connector has one end which is held in place in one of the hollow shafts by a shoulder on the inner surface of the shaft a cooperating with a collar on the tube. The collar is held against the shoulder by a compression spring extending between the collar and the hollow shaft of an axially adjacent idler. A portion of the tube projects into the adjacent idler and is sized and shaped slightly smaller than the interior of the hollow shaft so that the tube can be easily inserted therein. The other end of the tube is likewise inserted in its shaft for quick and easy installation of the tube. However, it is important that the ends of the tube should also be large enough to prevent lubricant under pressure from leaking between the tube and shafts. The free end (i.e. the end opposite the collared end) extends a sufficient distance internally of the shaft to allow a relatively wide range of lateral movement between the shafts without danger of expulsion therefrom.

The safety valve feature of the improved connector works as follows. The tube is flexible enough so that when the lubricant in the system exceeds a predetermined pressure the tube will deflect causing the free end of the tube to move outwardly. That end of the tube is tapered and an outer portion of the shaft enlarged so that as these areas become adjacent lubricant will escape therebetween before the end of the tube reaches the outer end of its cooperating hollow shaft. As soon as the pressure falls below the predetermined unsafe level through the escape of lubricant, the tube will return to its normal operating position.

In this way a flexible connector is provided between adjacent idler rollers for a complete "flow through" lubrication system and in addition provides the advantages described above.

BRIEF DESCRIPTION OF THE DRAWINGS

Other objects and advantages of the invention will become apparent from a detailed description of a preferred embodiment set forth below, when taken in conjunction with the accompanying drawing in which.

DETAILED DESCRIPTION OF A PREFERRED EMBODIMENT

Figure 1:
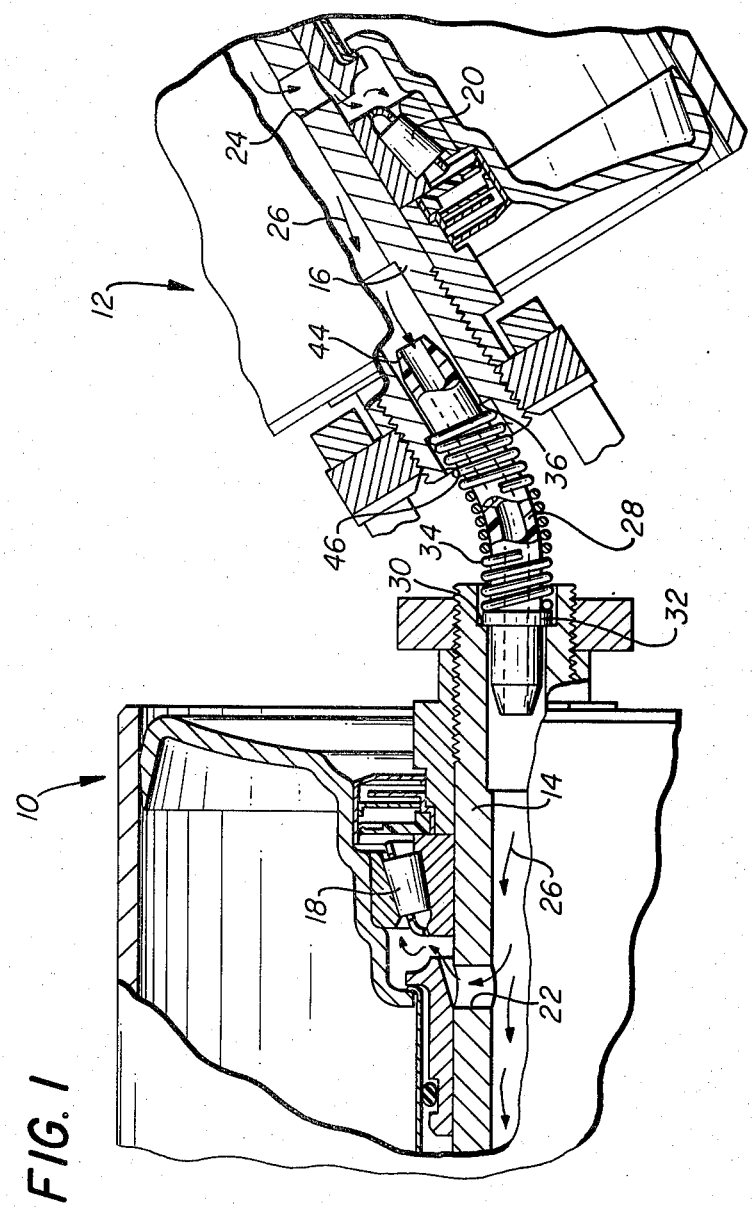
FIG. 1 is an elevational view, partially in section, showing in particular a portion of two catenary idlers connected by a flexible tube formed in accordance with the invention.
Figure 2:
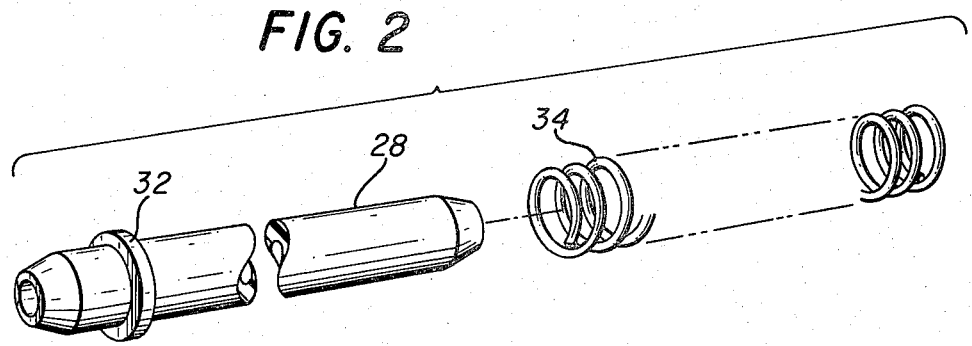
FIG. 2 is a perspective view of the tube along with its cooperating compression spring.

Referring to FIG. 1, a pair of idlers 10 and 12 are respectively mounted on hollow roller idler shafts 14 and 16 through appropriate roller bearings 18 and 20. The bearings 18 and 20 and associated seals are known in the art and will not be described in any greater detail. The interior of the shafts 14 and 16 communicate with the bearings 18 and 20 through openings designated by reference numerals 22 and 24, respectively, so that lubricant flowing under pressure in the hollow shafts 14 and 16 can lubricate the bearings 18 and 20.

This type of lubrication is known as a "flow-through" system where lubricant is injected at one end of a multiple idler assembly such as, for example, through a fitting (not shown) located on the right hand side of the roller 12, the lubricant flowing from right to left in FIG. 1 through the interconnected idlers as shown by arrows designated by reference numeral 26. Normally, in a catenary idler arrangement such as that shown in FIG. 1, three idlers are arranged end-to-end and support each other through an appropriate joint such as, for example, a universal joint of the type shown and described in U.S. Pat. No. 4,186,831 of common assignee with the instant invention. In such a three-idler arrangement, a third idler (not shown) is connected at the end of the idler 10 which is not shown in FIG. 1 and lubricant will also flow from idler 10 into that third idler.

The improved flexible connector which is the subject matter of this invention includes a flexible tube 28 for lubricant flow connection between shafts 14 and 16. The tube 28 can be formed of a number of different types of flexible material, urethane plastic being one which has been found suitable for the purposes of the invention.

As shown best in FIG. 1, the ends of the tube 28 are inserted in axially adjacent portions of the shafts 14 and 16. The outer diameter of tube 28 is sized to closely fit inside the shafts 14 and 16, so that lubricant will not leak between the tube 28 and interior surface of the shafts 14 and 16.

The interior surface of the shaft 14 is counterbored to form a shoulder 30 which mates with a collar 32 formed on the outer surface of the tube 28. A compression spring 34 is located around the outer surface of the tube 28, with one end thereof abutting the collar 32 and the other end abutting a second shoulder 36 which is formed on the inner surface of the shaft 16 so that the tension of the spring 34 will hold the collar 32 against the shoulder 30.

It has also been observed that in addition to holding one end of the tube 28 in place, the spring also adds to the structural rigidity and strength of the tube 28 when lubricant under pressure is present in the system.

Installation or removal of the tube 28 is a simple operation which can be accomplished by pushing the free end of the tube into the shaft 16 and compressing the spring 34 until the other end can either be inserted in or withdrawn from the shaft 14.

Figure 3:
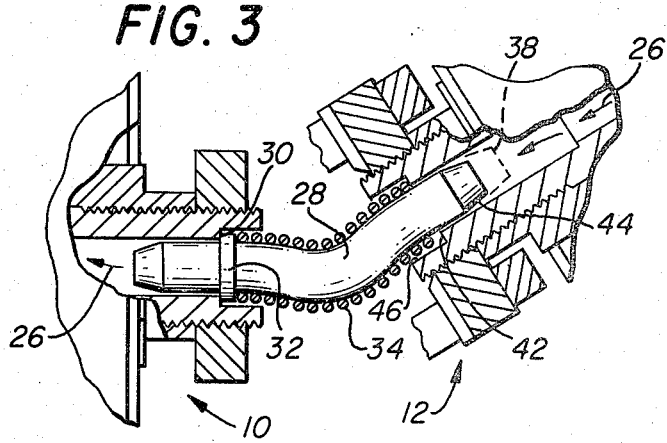
FIG. 3 is a plan view similar to FIG. 1 showing, in particular, the deflection of the flexible tube as the pressure of the lubricant increases.
Figure 4:
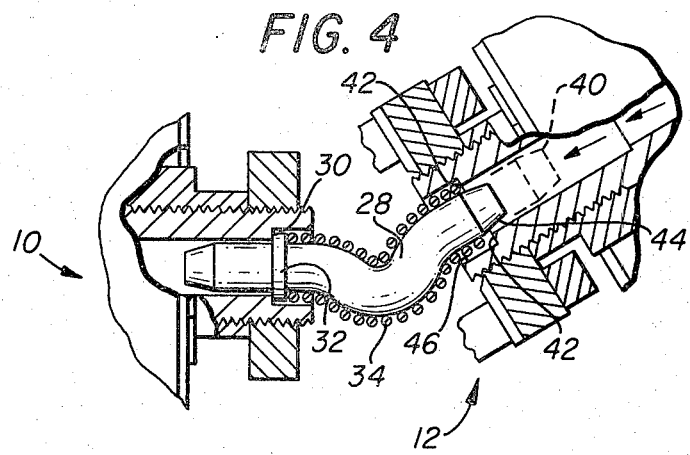
FIG. 4 is a plan view similar to FIGS. 1 and 3 showing, in particular, the flexible tube deflected to a point where lubricant will escape and lower the internal pressure of the system.

Because of the inherent flexibility of the tube 28, it operates as a safety valve for the lubricant as well as a lubricant connector between the hollow shafts of the two idlers 10 and 12. As shown in FIG. 3, the tube 28 will tend to deflect, as shown by the difference between the right hand end of the tube 28 and broken lines 38, when lubricant under pressure is in the system. Whenever the lubricant pressure reaches a predetermined level, the deflection will become great enough to axially move the free end to generally adjacent the shoulder 26, as shown by the difference between the right hand end of the tube 28 and broken lines 40 in FIG. 4, that a gap designated by reference numeral 42 is formed between the tube 28 and the inner surface of the shaft 16 through which the lubricant can escape and relieve the pressure danger. The gap 42 can be formed by tapering the free end of the tube 28 as shown by reference numeral 44 and providing an enlarged diameter portion 46 on the outer end of interior of the shaft 16 so that when the tube is deflected as shown in FIG. 4 the lubricant can escape before the tube reaches the outer end of the shaft 16. As soon as the dangerous pressure level is relieved, the flexible tube 28 will return to its normal position and operate as described above.

In one embodiment, the connector was formed of a urethane plastic known as Pellathane 2103-90A. The connector is 4½" long with an O.D. of 0.595"±0.005 and an I.D. of ¼". The tapered ends have a 15° slope and an O.D. at the outer ends of the tube of ⅜". The collar 32 is ⅛" thick with an O.D. of 0.72"±0.020 and is spaced ⅝ from the left end of the tube. The compression spring 34 can be formed of music wire and be 3" long (free length) with a 0.720 diameter. The spring rate is 7.25 #/in. and approximate load at solid height is 15½ lb.

In addition to providing the safety valve feature just described, the moveable end of the tube 28 also allows the idlers 10 and 12 to move laterally relative to each other without danger of rupturing the tube 28, which is a feature of greater importance for catenary idler arrangements than for ones where each idler is supported from a base (not shown).

Therefore, in accordance with the invention an improved lubrication connector for roller conveyors is provided which can easily be inserted or replaced as well as allow greater relative movement between adjacent idlers. In addition, the same device provides a safety valve for the lubrication system which relieves dangerous lubricant pressure without rupture or expulsion of the connector. It should be understood that those with ordinary skill in the art will be able to make modifications and improvements to the invention wthout departing from the spirit of the invention and that all such modifications and improvements are contemplated as falling within the scope of the appended claims.

I claim:

1. An improved lubrication connector for an idler roller assembly comprising axially adjacent idler rollers rotatably mounted on hollow shafts through associated bearing assemblies lubricated by forcing lubricant through the hollow shafts and flexible tube means for lubricant-flow communication of the axially adjacent hollow idler shafts for transporting lubricant from one shaft to the next in the assembly, the improvement comprising:

means for resiliently retaining one end of the tube in a predetermined position within one of the hollow shafts so that the interior of the tube will communicate with the interior of said hollow shaft, the other end disposed in the adjacent hollow shaft and sized large enough to prevent lubricant under pressure from leaking between the tube and cooperating shaft yet generally freely moveable therewithin, the tube being sufficiently flexible to deflect between adjacent shafts when the lubricant pressure exceeds a predetermined amount causing an end of said tube to move outwardly in its cooperating hollow shaft; and means adjacent said outwardly moved end defining a lubricant escape passage from the tube and shaft before said outwardly moved end of the tube reaches the outer end of its cooperating hollow shaft.

2. The improvement of claim 1, wherein the means for resiliently retaining one end of said tube in a predetermined position includes a shoulder formed on the interior surface of said one hollow shaft, a collar formed generally adjacent said one end of the tube for engaging said facing shoulder and preventing the tube from moving any farther into the hollow shaft, and biasing means for resiliently holding the collar against the shoulder.

3. The improvement of claim 2 and further including a shoulder formed on the interior surface of said adjacent hollow shaft, and wherein said biasing means includes a compression spring around the tube and extending between said collar and said shoulder of said adjacent shaft for resiliently forcing the collar into the shoulder of said one hollow shaft.

4. The improvement of claim 1, wherein said means defining said escape passage includes said outwardly moved end of said tube having a tapered outer diameter and an inner diameter generally larger than the outer diameter at the adjacent tube so that when the tube is sufficiently deflected to axially withdraw said tapered tube end to adjacent said outer portion at said shaft a gap will form therebetween and allow pressurized lubricant to escape.

5. A flexible tube connector for a flow through lubricating system between adjacent hollow shafts comprising means for resiliently holding one end of the tube in indexed lubricant flow communication relative to one of the shafts, the other end of the tube adapted to slidingly fit in the other shaft and sized to generally prevent pressurized lubricant from leaking therebetween, whereby upon the lubricant having a predetermined pressure limit the tube deflects between said shafts causing said other end of the tube to slide outwardly in said other shaft, and means defining a lubricant leakage passage between said other end and said other shaft for allowing lubricant to escape from the tube and shaft before said other end of the tube is expelled by said pressure from the outer end of its cooperating shaft.

6. The connector of claim 5, wherein the resilient holding means for holding one end of said tube in an indexed position includes cooperating surfaces which engage each other on the tube and shaft and spring means for establishing said engagement.

7. The connector of claim 6, wherein the cooperating surfaces include a collar on the outer surface of the tube adjacent said one end and a shoulder on the interior surface of said other of the shafts.

8. The connector of claim 7 further including a shoulder on the interior surface of the other shaft and said resilient holding means includes a compression spring adapted to fit around the tube between the collar and the shoulder of said other shaft.

9. The connector of claim 5, wherein the lubricant leakage passage includes the tube and shaft being shaped to form a gap therebetween after said other end of said tube moves to generally adjacent the interior surface of the opening of said other shaft.

10. The connector of claim 9, wherein said other end of the tube is tapered and the interior surface of the cooperating shaft has an enlarged diameter portion.

* * * * *